July 7, 1970 W. L. LINDLEY 3,519,053
AUXILIARY SAFETY WHEEL FOR TUBELESS TIRES
Filed Dec. 13, 1967 2 Sheets-Sheet 2
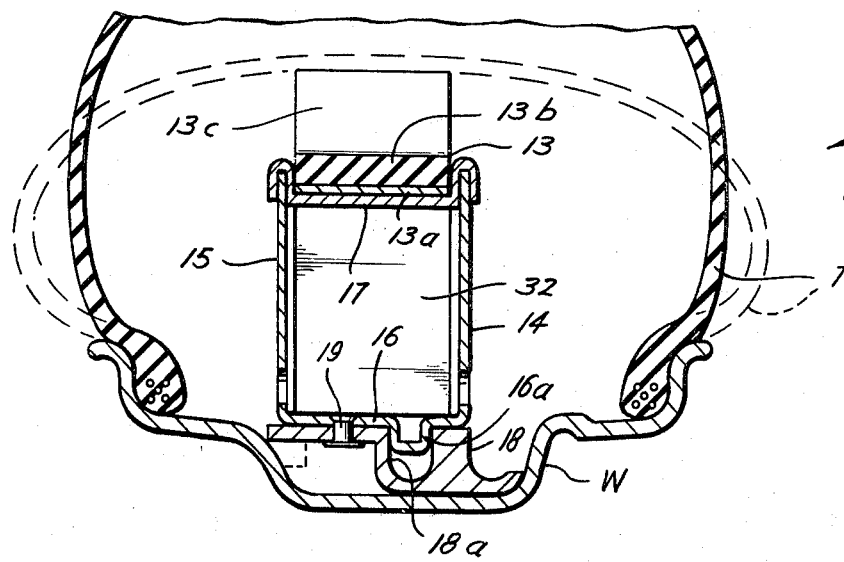
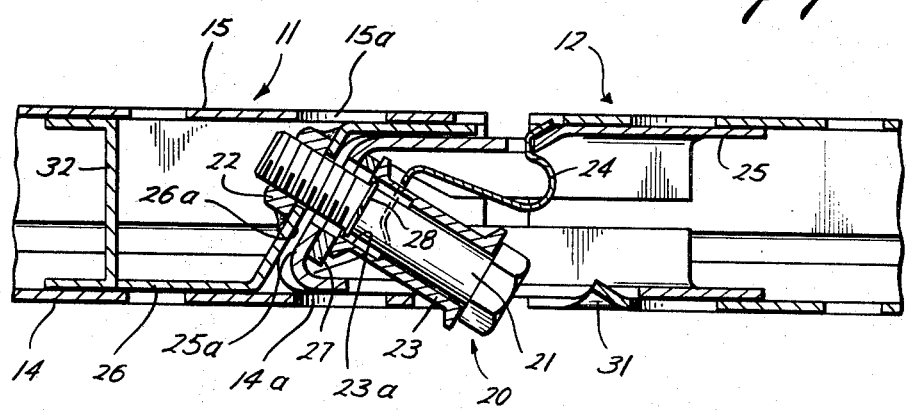
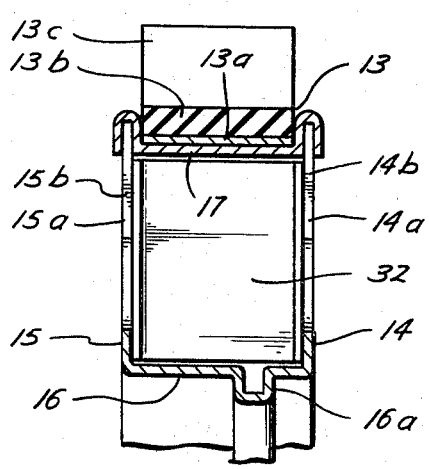
INVENTOR
William L. Lindley
BY
Hayden Pravel Wilson & Matthews
ATTORNEYS 3,519,053
AUXILIARY SAFETY WHEEL FOR TUBELESS TIRES
William L. Lindley, Suite 303, 1616 West Loop S., Houston, Tex. 77027
Filed Dec. 13, 1967, Ser. No. 690,280
Int. Cl. B60c 17/04
U.S. Cl. 152—158　　　　　　　　　　　　　　6 Claims

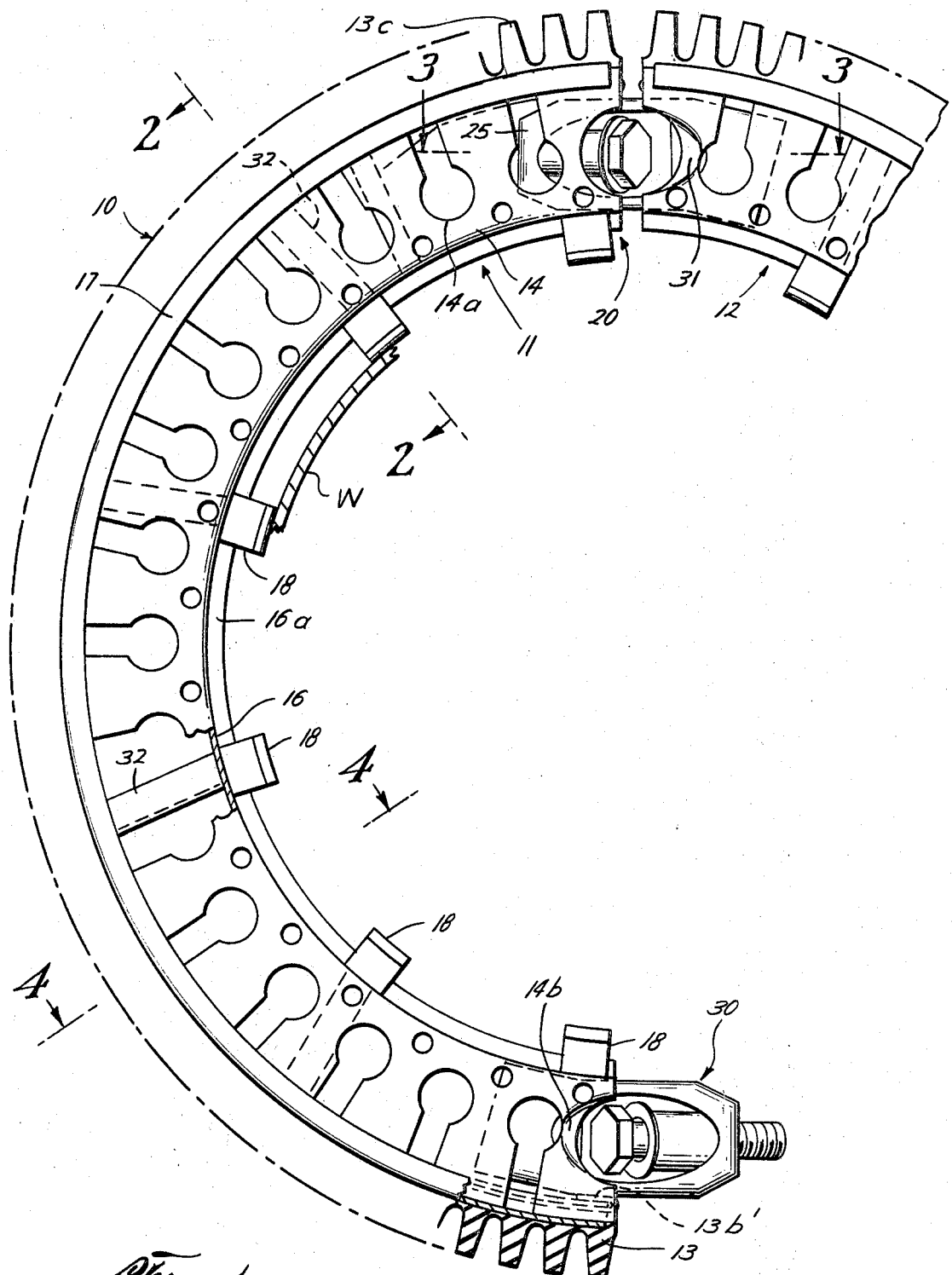

ABSTRACT OF THE DISCLOSURE

A segmented reinforced annular framework employs a particular type of locking arrangement at the end of the segments to tighten the framework about the dropcenter of a wheel. A serrated, resilient covering is secured to the outer circumference of the framework to absorb the weight of the vehicle when the tire mounted on the wheel is deflated.

CROSS-REFERENCE TO RELATED APPLICATIONS

This application relates to another form of a similar device disclosed and claimed in my prior copending application Ser. No. 535,540 filed Mar. 18, 1966, now Pat. No. 3,394,749, issued July 30, 1968.

BACKGROUND OF THE INVENTION

Field of the invention

The present invention relates generally to safety devices for vehicles and in particular to a means for preventing loss of control of a moving vehicle and substantial tire damage when a conventional tubeless pneumatic tire on the vehicle is deflated while the vehicle is in motion.

Description of the prior art

The prior art includes various devices intended to prevent loss of control of a vehicle or undue damage to a tire when the tire is deflated while the vehicle is in motion. One such device is disclosed in U.S. Pat. No. 2,775,282 issued to C. T. Kennedy. The Kennedy device is bolted onto a mounting member which in turn is inserted to the dropcenter of a conventional wheel. When a pneumatic tire mounted on the wheel is deflated, it flattens until it engages the outer circumferential surface of the Kennedy device. This prevents the rim of the wheel from riding against the tire and thus reduces tire damage and assists in maintaining control of the vehicle to which the tire and wheel are attached.

Another such device is disclosed in U.S. Pat. No. 2,241,858 issued to J. J. Hruska. The Hruska device which employs the same basic principle is of segmented construction with the individual segments being bolted directly to the drop center of a conventional wheel.

Because of their construction, both the Kennedy and the Hruska devices require that the wheels be modified before the device may be attached. Moreover, both prior art devices are difficult to install in that a great number of connecting bolt and nut assemblies must be positioned and tightened with the tire partially mounted over the wheel. Similarly, when it is desired to remove the tire from the wheel, the numerous bolt and nut assemblies must first be removed.

The prior art devices of the type described have also been objectionable in that they do not adequately prevent tire damage. In such devices, continued rotation of a deflated tire for even a short time can result in irrepairable damage to the tire body.

SUMMARY OF THE INVENTION

The apparatus of the present invention is a multiple part annular framework with a resilient covering over its outer circumferential surface. The segments are joined to each other within the dropcenter of a wheel by a unique bolt and nut arrangement carried at each of the segment ends which enables the apparatus to be more easily assembled on the wheel since it is readily accessible when a tire is partially mounted over the wheel.

The multiple part framework is tightened securely about the dropcenter of the wheel by merely tightening the bolt and nut assemblies which are affixed to the ends of the segments in such a way as to draw the segments together.

A primary object of the present invention is that the bolt and nut assemblies of the present invention are readily accessible when a tire is partially mounted over the wheel to thereby simplify installation and removal of the apparatus.

The outer circumferential surface of the framework of the apparatus is covered with a resilient serrated layer of hard rubber which absorbs and distributes the weight of the vehicle to protect the tire and to aid in preventing loss of control while the vehicle is in motion. The serrations assist in same cooling the deflated tire as well as the rubber layer itself and to maximize the area over which the weight of the vehicle is distributed.

BRIEF DESCRIPTION OF THE DRAWINGS

FIG. 1 of the drawings is an elevation of the apparatus of the present invention with portions of the apparatus broken away for purposes of illustration;

FIG. 2 of the drawings is a sectional view of the apparatus of the present invention taken along the lines 2—2 of FIG. 1;

FIG. 3 of the drawings is a sectional view of the apparatus of the present invention taken along the lines 3—3 of FIG. 1;

FIG. 4 of the drawings is a sectional view of the apparatus of the present invention taken along the line 4—4 of FIG. 1.

DESCRIPTION OF THE PREFERRED EMBODIMENTS

With reference to FIG. 1, the auxiliary safety wheel of the present invention indicated generally at 10 is shown as including two cooperating semicircular segments indicated generally at 11 and 12. A portion of the segments 11 and 12 has been broken away for clarity of illustration. Each of the segments 11 and 12 is of semicircular construction and the two segments cooperate to form a circular wheel. It can be appreciated that more than two segments could be used to form a circular wheel, and the use of two in the present description is merely for purposes of illustration.

The segments 11 and 12 are united within the dropcenter of a conventional wheel such as the wheel W, a portion of which is indicated in cross-section in FIG. 2 of the drawings. A resilient covering 13 of synthetic rubber or other suitable resilient material is secured to the outer circumferential surface of each of the segments 11 and 12. When the tire T represented in FIG. 2 is deflated, it engages the covering 13 as indicated by the dotted lines in FIG. 2 to prevent the rim of the wheel W from running on the tire T, and in this situation acts as a load bearing surface for the tubeless tire T which is mounted on the wheel W.

With reference to FIGS. 1, 2 and 4 of the drawings, the semicircular segment 11 is a generally U-shaped framework bearing side walls 14 and 15 and a base 16. It should be noted at this point that while the following description is specifically directed to the segment 11, the segment 12 is of similar construction with only a few exceptions which will be noted. The base 16 includes a projecting ridge 16a which cooperates with a mounting adapter in a manner and for a purpose to be described.

Keyhole shaped slots 14a and 15a are cut into the side walls 14 and 15 respectively to reduce the overall weight of the segment 11 as well as to improve cooling. Also in forming the segments, portions 14b and 15b of the keyhole slots is initially very narrow in width, but enlarge as the segments are formed. This enables the segments to assume the desired configuration and reduces the tendency of the metal to crimp.

The side walls 15 and 16 are secured by a semicircular plate 17 which extends about the outer circumference of the two side walls. The plate 17 may lap over the sides of the walls 15 and 16 and is depressed along its central portion to provide a mounting surface for covering 13. The overlapping portions of the plate 17 are permanently secured to the side walls 14 and 15 by spot welding or other suitable means.

The resilient covering 13 is bonded to a flat metal strip 13a which in turn is secured to the recessed portion of the plate 17. The strip 13a may be secured by rivets, spot welding or any other suitable means, including means which would permit the subsequent removal and replacement of the strip 13a and the covering 13. The end 13b of the strip 13a is folded over the end of the plate 17 at each end of each segment as illustrated in FIG. 1 of the drawings.

With reference to FIGS. 1 and 4, the integral rubber covering 13 includes a base layer 13b from which extend serrations 13c. The base layer 13b may extend above the lapped edges of the plate 17 as best illustrated in FIGS. 1, 2 and 4 of the drawings.

With reference to FIGS. 1 and 2 of the drawings, a suitable number of adapter pieces 18 are secured at circumferentially spaced intervals to the base 16 of the U-shaped framework by rivets 19 or other suitable means. The ridge 16a formed along the frame base 16 is received by a channel 18a formed in the adapter pieces 18. The rivet 19 cooperates with the interlocking ridge 16a and channel 18a to fix the adapter 18 relative to the base 16.

The adapters 18 conform to the contour of the drop center of the wheel W to provide a secure footing for the segments 11 and 12. It can be appreciated that the configuration of the adapters may vary depending upon the configuration of the drop center in the rim; however the channel 16a acts as a spacer to properly position the adapters 18 regardless of their configuration.

With reference to FIG. 3, the two segments 11 and 12 are joined together at one end by a locking means indicated generally at 20. The locking means 20 includes a bolt 21 carried in the end of the segment 12 and a cooperating nut 22 carried in the end of the segment 11. The shank of the bolt 21 extends through a mounting spool 23 which in turn is loosely held in position by a forked, spring steel member 24, which fits about the spool and holds it between the spring forked ends and spacer 27. The bolt 21, spool 23 and spring 24 are mounted in a supporting male structure 25 which is contained within the end of the segment 12. The structure 25 is spot welded or otherwise suitably secured to the inside surfaces of the side walls and base of the wheel segment 12.

The segment 11 includes a plate 26 which is welded or otherwise secured within the end of the segment 11. The plate 26 has a slanted face 26a which is parallel to the slanted face 25a provided at the extreme end of the male structure 25. A nut 22 is welded or otherwise suitably secured to the back surface of the face 26a to prevent it from moving when it is engaged by the bolt 21.

A spacer 27 is affixed to the inner surface of the face 25a by any suitable means to act as a stop for the flange of the spool 23.

A split ring 28 is locked about the shank of the bolt 21 to prevent it from being removed from the bore of the spool 23. The spool bore is enlarged slightly as shown at 23a to permit sufficient longitudinal movement of the bolt 21 allowing it to be completely disengaged from the nut 22.

The male portion of a second locking means indicated generally at 30 is formed on the other end of segment 11, such locking means being identical to the arrangement previously described on segment 12. The male locking means 30 cooperates with a female locking means (not illustrated) formed on the segment 12, which is identical to the arrangement described on the other end of segment 11.

As best illustrated in FIG. 1 of the drawings, both the head of the bolt 21 and the head of the bolt in the locking means 30 are accessible from the same side of the segments 11 and 12. The longitudinal axis of the two bolts is inclined to the plane of the side wall 14 and the corresponding wall of the segment 12. The sidewall 14 and the corresponding sidewall of the segment 12 are depressed as indicated at 14b and 31 respectively to provide for easier access to the bolt head. The inclination of the bolts and the depression of the sidewalls permit engagement of the bolts by a lug wrench or the like when the segments are positioned in the dropcenter of a wheel and a tire is partially mounted on the wheel.

Both of the segments 11 and 12 are provided with reinforcing plates 32 which are welded between the side walls 14 and 15 at circumferentially spaced points on the segments. The plates 32 substantially increase the strength of the segments 11 and 12 without adding appreciably to their total weight.

The safety wheel of the present invention is installed with only the inboard bead of the tire T disposed within the dropcenter of the wheel W.

The outboard bead of the tire T is lifted away from the wheel W and the individual segments 11 and 12 are passed singly through the space formed between the tire T and the wheel W. The direction of curvature of each of the segments 11 and 12 is aligned within the drop center of the wheel W, to conform to the curvature of the wheel. The two segments are then placed in end to end relationship to form a circle. The bolts in the locking means 20 and 30 may be rotated by hand or a suitable wrench to engage the nuts carried in the end of the cooperating segment.

A wrench is then used to tighten the locking means securely about the drop center of the wheel W. It will be apparent that while the bolts, such as the bolt 21, is inclined, the locking means 20 and 30 confine the movement of the two segments causing them to be drawn together as the bolts are tightened.

When the bolts have been tightened, the adapters 18 firmly grip the drop center of the wheel W. The firm grip prevents any rotation of the segments 11 and 12 with respect to the turning wheel W when the tire T is deflated. The outboard bead of the tire T is then placed within the rim of the wheel W and the tire is inflated.

Loss of air pressure in the tire T forces the tire to ride against the covering 13. The serrations 13c of the covering 13 assist in preventing the tire T from moving with respect to the rotating wheel W and also assist in distributing the weight of the vehicle over a wider surface area of the tire as well as passing the "bunched" portion of the flat tire between the covering 13 and ground surface.

The foregoing disclosure and description of the invention are illustrative and explanatory thereof and various changes in the size, shape, and materials, as well as in the details of the illustrated construction, may be made within the scope of the appended claims without departing from the spirit of the invention.

What is claimed is:
1. An auxiliary safety wheel comprising:
  (a) a segmented framework means having segments with adjoining ends with said framework being circular in one plane;
  (b) locking means carried at the adjoining ends of each of said segments for locking said segments together;

(c) covering means carried on the outer circumferential surface of said framework;
(d) adapter means for conforming said framework to the dropcenter of a wheel;
(e) each of said locking means including a bolt and nut assembly with the longitudinal axis of said bolt being inclined at an angle of less than 90° with respect to the plane within which said framework is circular;
(f) said framework comprising at least two segments, each having a male and a female end; and
(g) each of said segments carrying a bolt in its male end and a nut in its female end.

2. The invention of claim 1 including reinforcing means at circumferentially spaced intervals within said framework.

3. An auxiliary safety wheel comprising:
(a) a segmented framework means having segments with adjoining ends with said framework being circular in one plane;
(b) locking means carried at the adjoining ends of each of said segments for locking said segments together;
(c) covering means carried on the outer circumferential surface of said framework, said covering means including a serrated resilient material;
(d) adapter means for conforming said framework to the dropcenter of a wheel;
(e) each of said locking means including a bolt and nut assembly with the longitudinal axis of said bolt being inclined at an angle of less than 90° with respect to the plane within which said framework is circular;
(f) said framework comprising two segments, each having a male and a female end; and
(g) each of said segments carrying a bolt in its male end and a nut in its female end.

4. The safety wheel of claim 3 wherein the base of the serrations of said serrated covering are formed along a circumference which is greater than the greatest circumference of said framework.

5. An auxiliary safety wheel comprising:
(a) a segmented framework means having segments with adjoining ends with said framework being circular in one plane;
(b) locking means carried at the adjoining ends of each of said segments for locking said segments together;
(c) covering means carried on the outer circumferential surface of said framework;
(d) adapter means for conforming said framework to the dropcenter of a wheel;
(e) each of said locking means including a bolt and nut assembly with the longitudinal axis of said bolt being inclined at an angle of less than 90° with respect to the plane within which said framework is circular;
(f) said framework comprising two segments, each having a male and a female end; and
(g) each of said segments carrying a bolt in its male end and a nut in its female end.

6. The safety wheel of claim 5 wherein said adapter means are permanently secured to said framework.

References Cited

UNITED STATES PATENTS

| | | | |
|---|---|---|---|
| 3,080,906 | 3/1963 | Payne | 152—175 |
| 3,142,326 | 7/1964 | Lindley | 152—158 |
| 3,394,749 | 7/1968 | Lindley | 152—158 |
| 3,420,288 | 1/1969 | Unruh | 152—158 |

ARTHUR L. LA POINT, Primary Examiner

C. B. LYON, Assistant Examiner